Jan. 17, 1939.  R. S. SANFORD  2,144,034
CLUTCH CONTROL MECHANISM
Filed Jan. 20, 1936
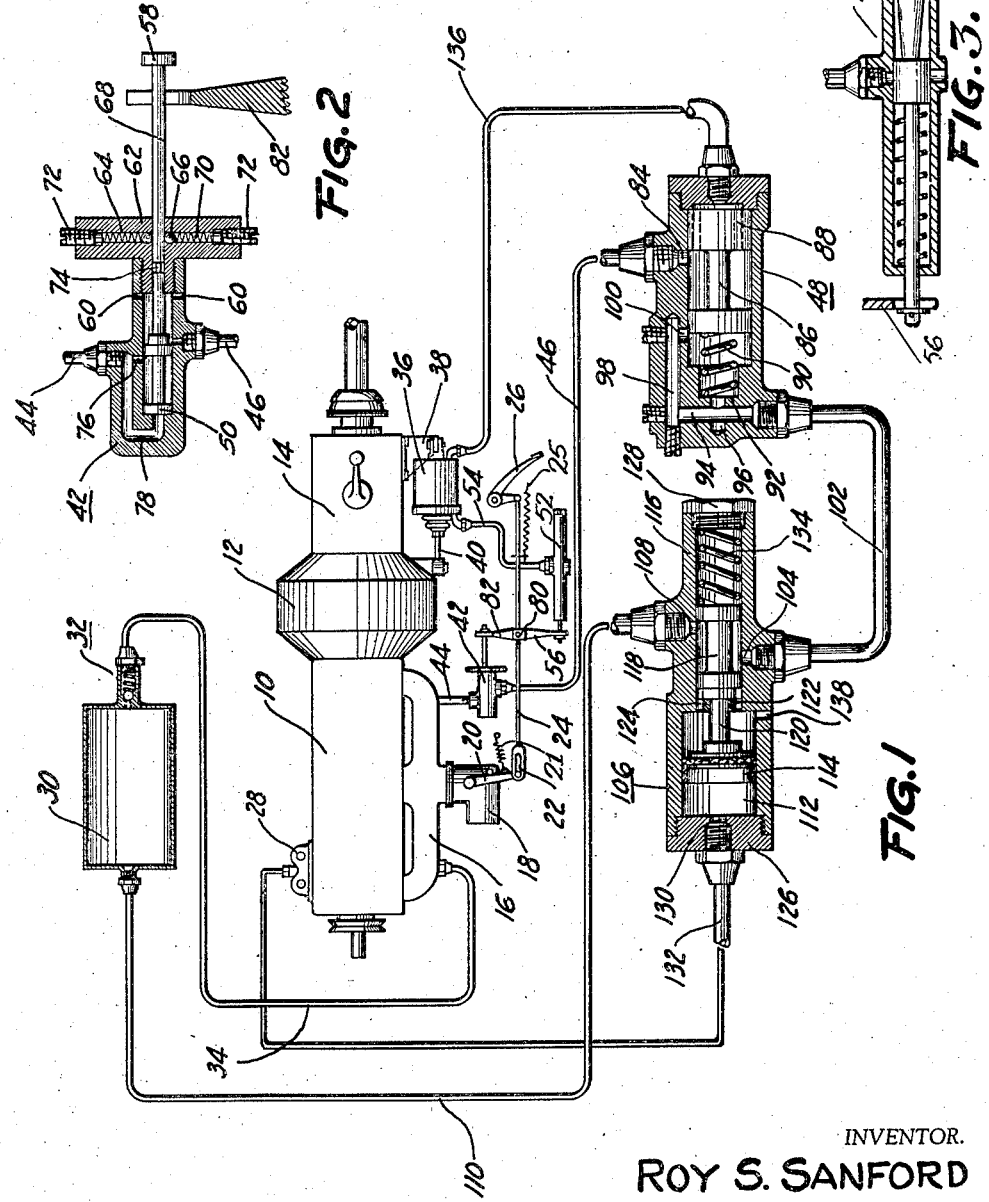
INVENTOR.
ROY S. SANFORD
BY H. C. Clayton
ATTORNEY Patented Jan. 17, 1939

2,144,034

UNITED STATES PATENT OFFICE 2,144,034

CLUTCH CONTROL MECHANISM

Roy S. Sanford, New York, N. Y., assignor to Bendix Products Corporation, South Bend, Ind., a corporation of Indiana Application January 20, 1936, Serial No. 59,857

11 Claims. (Cl. 192—.01)

My invention relates to control mechanism for automotive vehicles and particularly to automatic manipulation of the clutch thereof.

An object of the invention is to eliminate the possibility of stalling the motor when it is laboring under excessive load, as when starting off uphill or from a sandy surface, by automatically throwing out the clutch to relieve the said motor from such load.

A feature of the invention resides in the utilization of vacuum power for this purpose, said power being in part controlled by the speed of the motor in such a manner as to be operable only when the motor is rotating at a predetermined maximum speed or therebelow.

Another object of the invention resides in the manner in which the above mechanism is associated with intake manifold vacuum declutching mechanism wherein the vacuum power is secured from the intake manifold of the vehicle engine for disengaging the clutch during normal operation of the vehicle. I propose to utilize vacuum power in the form of an auxiliary vacuum tank to supply the power operable to prevent stalling of the motor, and an important feature of the invention resides in the manner in which these two power sources are so associated with the power operated clutch actuating mechanism that power is available under any circumstances to prevent stalling of the motor.

A further object of the invention is to provide a clutch operating power means automatically operative, at or below a critical engine speed, to insure a disengagement of the clutch.

Yet another object of the invention is to provide, in a clutch operating power means incorporated in an automotive vehicle, an automatically operated power operated valve operative to control the operation of a relay valve, the latter being operable to insure a disengagement of the clutch when the engine of the vehicle is rotated at or below a predetermined speed.

A further object of the invention is to provide, in an automotive vehicle provided with a clutch, power means for insuring a disengagement of the clutch after the clutch has been engaged to effect a laboring of the engine.

Various other meritorious features of the invention will be apparent from the following description taken in conjunction with the drawing, wherein like numerals refer to like parts throughout the several figures and wherein:

Figure 1 is a diagrammatic illustration of the control mechanism including sections through my valve mechanisms;

Figure 2 is a section through the accelerator control and clutch booster operating valve; and Figure 3 is a sectional view of the bleed valve.

Referring now to Figure 1, the numeral 10 represents a combustion engine mounted in conjunction with a clutch 12 of any desired type, which clutch is, of course, adapted to be thrown out of engagement to permit shifting of the gears in the transmission box 14. The engine is provided with an intake manifold 16 to which is secured a carburetor 18, the valve of which is operated through an arm 20 coupled through a lost motion connection 22 with accelerator rod 24, which is manipulated by the accelerator pedal 26. The arm 20 and pedal 26 are respectively biased to their released positions by springs 21 and 25. An oil pump is illustrated at 28 in position to be run directly from the engine 10 and a vacuum tank 30, including the one-way exhaust valve 32, is connected with the intake manifold by the vacuum line 34.

Power operated mechanism in the form of a vacuum booster cylinder 36 is secured to the vehicle in any desired manner, as by the flange 38 secured to the transmission box 14, and includes the usual slidable piston therein to which is secured a piston rod 40 which is operable to disengage the clutch and permit its reengagement.

As explained in my copending applications Serial No. 645,298 and Serial No. 716,249, a clutch control valve 42 is tied into the intake manifold through conduit 44. Communication between said valve and the booster cylinder 36 is provided through a conduit 46, in which is interposed a secondary control valve 48 which will be described more in detail hereinafter.

The clutch control valve 42 is illustrated in detail in Figure 2 and includes a spool valve 50 slidable therein to open and close communication between vacuum lines 44 and 46. The rear end of the valve is vented to air as at 60, and a threaded closure 62 provided for the rear end of the valve includes drilled passages 64 adapted to seat spring pressed balls 66 against the valve rod 68, which is secured to the spool valve and extends rearwardly out through the valve casing. Springs 70 retain these balls positioned against the said valve rod and the tension of the springs may be adjusted as desired by means of the threaded members 72.

A restriction 74 is provided in the valve rod 68 in which the balls 66 are adapted to seat during sliding movement of said valve rod to momentarily retain the rod and its spool valve 50 in a given position for a purpose to be more clearly described hereinafter. Access of the vacuum in line 44 to the interior of the valve casing is provided by a port 76, and a second peripheral port 78 extends to the forward end of said valve casing to permit creation of a vacuum in front of the spool valve 50.

A double-armed bracket 80 is positioned upon the accelerator rod 24, one arm 82 providing a one-way connection with valve rod 68 through engagement with a head 58 positioned on the rear extremity of said valve rod. The bracket 80 is so positioned that when the accelerator pedal is in released position the spool valve 50 is drawn to the limit of its rearward movement within the valve casing. Under these circumstances, vacuum may pass through the valve 42 and operate through line 46. When the accelerator is depressed, initial movement thereof takes up the lost motion in connection 22 and at the same time permits the spool valve 50 to be drawn forwardly by the vacuum established in the front portion of the valve casing to ultimately reach the position illustrated in Figure 2, at which time the vacuum from the intake manifold is closed to line 46. Just prior to closing movement, however, the spring pressed balls 66 will engage the restriction 74 to momentarily check the movement of the spool valve 50, thereby insuring sufficient vacuum in the line 46 prior to speeding up the engine to accomplish its intended function.

It will therefore be seen that upon releasing the accelerator pedal 26 the line 46 is placed in communication with the partially evacuated intake manifold. Line 46 communicates through port 84 with the interior of secondary valve 48. This secondary valve is provided with a spool valve 86, the rear head of which is provided with a plurality of axially drilled passages 88. The forward head of the spool valve 86 provides a seat for coil spring 90, which seats at its other end upon a shoulder 92. The valve casing is provided with a transverse passage 94 which communicates intermediate its length with an axial passage 96 opening into the interior of the valve casing and at one extremity with a longitudinal passage 98 which opens into the interior of the valve, as indicated at 100.

The other end of the transverse passage 94 is connected with a line 102, which in turn is connected with port 104 of the motor controlled valve 106. Another port 108 in said valve is connected by vacuum line 110 with the auxiliary vacuum tank 30. The motor control valve 106 includes a large forward bore 112 in which a piston 114 is slidably received and a smaller rear cylinder 116 in which the spool valve 118 is slidably received. The piston 114 and the spool valve 118 are connected by what may be called a valve rod 120 extending through a partition 122 between the two cylinders within the valve. This partition 122 is vented by longitudinal passages 124.

Opposite ends of the large cylinder and small cylinder are closed respectively by threaded members 126 and 128, closure 126 being provided with a port 130 through which access is provided to the pressure developed by pump 28 by means of a conduit 132. While any type of pressure developing device which is driven from the motor may be utilized in conjunction with the mechanism herein described, an oil pump has been suggested because of the conventionality of such pumps and the adequacy of pressure developed thereby. A coil spring 134, seated at one end against the closure 128 and at the other against one head of the spool valve 118, tends to maintain the said spool valve in the position illustrated in Figure 1.

Heretofore the operation of the mechanism whereby line 46 is placed under vacuum has been explained. Under normal conditions, where there is not any tendency for the motor to stall because of excessive load, the secondary control valve 48 is connected with the source of vacuum via port 84, passages 88 and vacuum line 136, the latter extending to the clutch booster cylinder 36 to withdraw the clutch and permit shifting of the gears. As the accelerator is depressed, the line 46 is vented to air as the spool valve 50 in primary control valve 42 reaches the point illustrated in Figure 2, which air venting is communicated to the clutch booster cylinder 36 through the aforesaid lines.

Under such conditions, the spool valve 86 of secondary clutch control valve 48 is maintained in the position illustrated in Figure 1 by the coil spring 90, thereby closing the port 100 and shutting off the vacuum in line 102 from motor controlled valve 106 and its connecting line 110 to the auxiliary vacuum tank 30. Spool valve 118 of the motor controlled valve is normally maintained in the position illustrated in Figure 1 by the coil spring 134.

However, when primary control valve 42 has vented the clutch booster cylinder to air and the lost motion connection 22 is taken up, there may be such an excessive load upon the motor that there may be a tendency to stall. The coil spring 134 is of a strength adapted to retain the spool valve 118 seated, as indicated in the drawing, against pressure developed in line 132 by the pump 28, when the said pump is rotating at a speed corresponding to ordinary idling speed of the engine 10 plus, say, one hundred R. P. M. When the speed of the motor increases, pressure in line 132 is increased to the extent that piston 114 is moved rearwardly to the end of cylinder 112, which action obviously actuates the spool valve 118 to open the port 104 to the atmosphere via ports 124 and a port 138, thereby permitting the spring 90 to move the valve 86 to the position disclosed in Figure 1. If the load upon the engine should be such that the motor speed does not increase, and tends to stall, spool valve 118 will remain in the position indicated and vacuum from the auxiliary tank 30 will operate through line 102 to draw the spool valve 86 against the resistance of spring 90 to open the port 100, thereby placing the auxiliary vacuum tank in communication with the line 136 to the clutch booster cylinder through the two valves. The rear head of the spool valve 86 operates upon initial movement thereof to close the port 84, thereby preventing further venting of the booster cylinder 36 to air from the primary control valve 42.

It will therefore be apparent that an arrangement has been provided which positively operates to maintain one or the other of the two vacuum lines to the clutch booster cylinder 36 open to vacuum until the motor has increased its speed to an extent which will eliminate the danger of stalling. It is possible that the spool valve 86 in secondary control valve 48 may shuttle somewhat, but nevertheless it will operate to constantly maintain a vacuum in the booster cylinder as long as the motor speed does not increase above a critical R. P. M.

A bleed valve 52 is connected to the clutch booster 36 through a conduit 54. The bleed valve is positively actuated by a depending arm 56 on bracket 80 and functions to control the air exhaust from the booster cylinder on clutch engaging movement of the piston therein. This valve forms no part of the present invention and is therefore not described in detail herein.

Having illustrated one preferred form of the invention, other modifications will be apparent to those skilled in the art, and for that reason I wish to limit myself only within the scope of the appended claims.

I claim:

1. In an automotive vehicle provided with an accelerator, a clutch and an internal-combustion engine having an intake manifold, power means for operating the clutch, said means including a pressure differential operated motor operably connected with the clutch, and further including two separate sources of power to energize said motor, together with an accelerator operated valve for in part controlling one power source and a power operated valve for in part controlling said other power source.

2. In combination with an automotive vehicle having an engine intake manifold, a clutch and an accelerator pedal, vacuum operated means for actuating said clutch on release of said accelerator pedal, and power means dependent upon the speed of said motor operable to throw out said clutch at engine idling speed regardless of the position of said accelerator pedal.

3. In combination with a motor vehicle including an engine having an intake manifold, an accelerator, a clutch and power operated means for actuating the same, means associated with said manifold and operable upon release of the accelerator to energize said power means to disengage said clutch, and means associated with said engine and operable at idling R. P. M. thereof to continue energization of the power means regardless of the position of the accelerator.

4. In combination with a motor vehicle including an engine having an intake manifold, an accelerator, a clutch and power operated means for actuating the same, means associated with said manifold and operable upon release of the accelerator to energize said power means to disengage said clutch, and means associated with said engine and operable at idling R. P. M. thereof to continue energization of the power means when the accelerator pedal is depressed.

5. In combination with a motor vehicle having an engine, a pump driven thereby, a clutch and fuel control mechanism, power means coupled with the clutch and including control mechanism associated with the fuel control operable to render said power means effective to throw out said clutch when said fuel control is in engine idling position, and means controlled by said pump for maintaining energization of the power means when the fuel control is positioned above motor idling speed without increasing the actual R. P. M. thereof.

6. In an automotive vehicle provided with an engine and a clutch, power means for operating the clutch including a pressure differential motor operably connected to the clutch, and means for controlling the operation of said motor including means automatically operable at or below a critical engine speed to insure a clutch disengaging operation of said motor, said latter means including a fluid operated three-way valve.

7. In an automotive vehicle provided with an engine, an accelerator and a clutch, power means for operating the clutch comprising a differential pressure operated valve and an accelerator operated valve, each of said valves in part controlling a separate source of vacuum for energizing said power means to disengage the clutch.

8. In an automotive vehicle provided with an internal-combustion engine and a clutch, power means for operating the clutch, said means comprising a differential pressure operated three-way valve automatically operative, when the engine is about to stall, to effect a clutch disengaging operation of said power means.

9. In combination with a vehicle having an engine, a pump driven thereby, a clutch and power means operable to disengage said clutch, and means operable by the pressure created by said pump at greater than normal idling R. P. M. to render said power means ineffective to disengage the clutch, said means including a motor and a three-way valve, the latter being operated by the motor at the aforementioned engine speeds.

10. In combination with a vehicle having an internal-combustion engine and a clutch, power means for operating the clutch comprising a pressure differential operated motor operably connected with the clutch and means for controlling the operation of said motor including a control valve, power means for operating said valve, said power means including a three-way valve, and means for operating said three-way valve including a differential pressure operated power means.

11. In combination with a vehicle having an internal-combustion engine and a clutch, power means for operating the clutch comprising a pressure differential operated motor operably connected with the clutch and means for controlling the operation of said motor including a control valve, power means for operating said valve including a motor, and valve means automatically operable at or below a critical speed of the engine to effect an energization of the motor to operate the aforementioned control valve.

ROY S. SANFORD.